Oct. 2, 1956  H. A. DZAACK  2,764,955
DEVICE FOR SUMMING-UP AUTOMATICALLY THE ADDITIONAL
WEIGHT IN BALANCES WITH A REGISTERING DEVICE
Filed Oct. 4, 1954                                   3 Sheets-Sheet 2
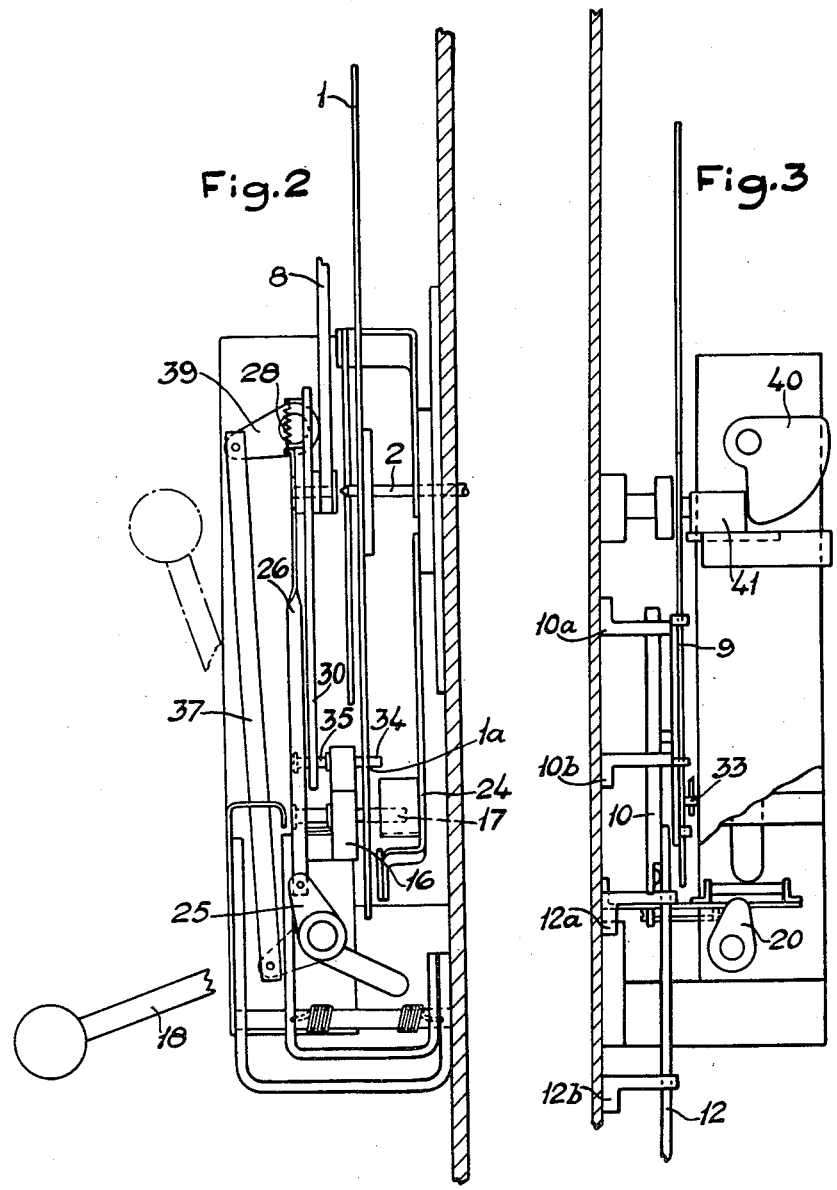
Inventor
H. A. Dzaack

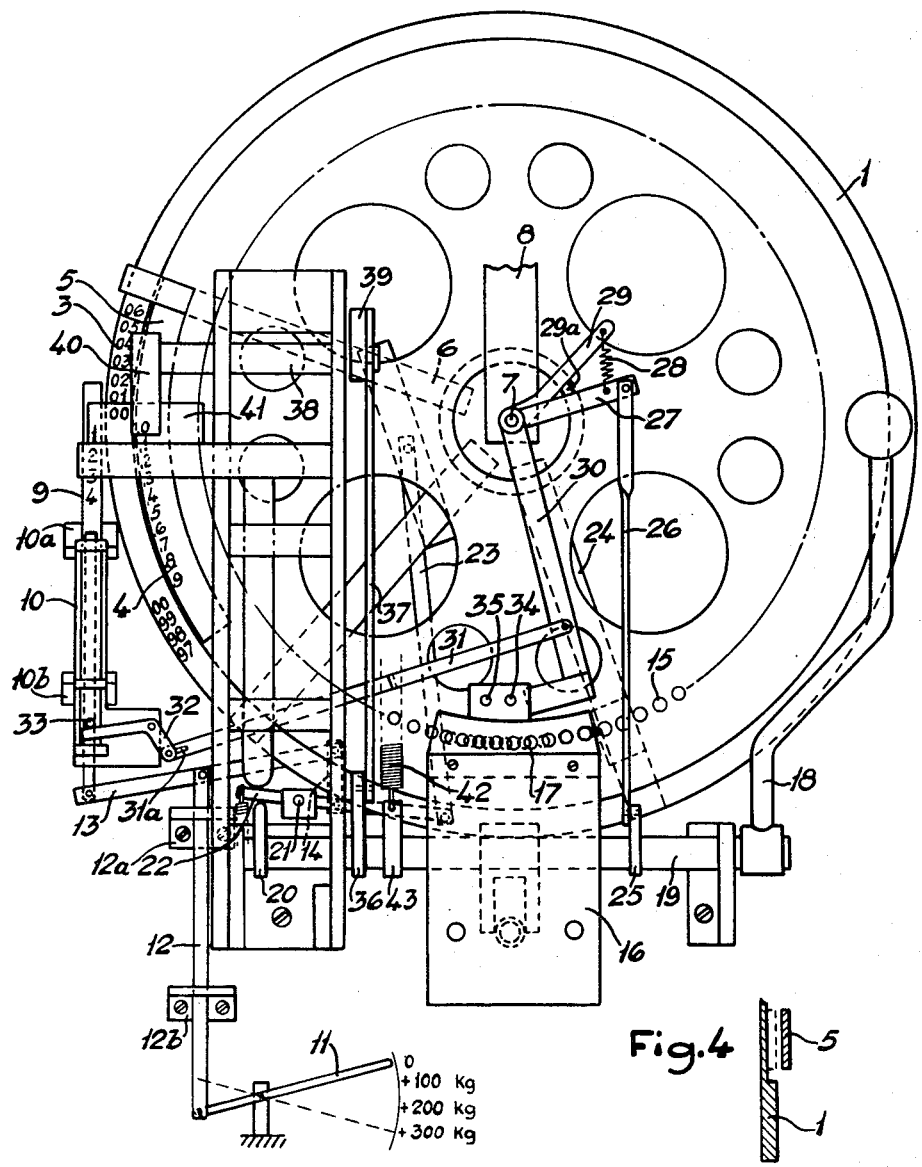

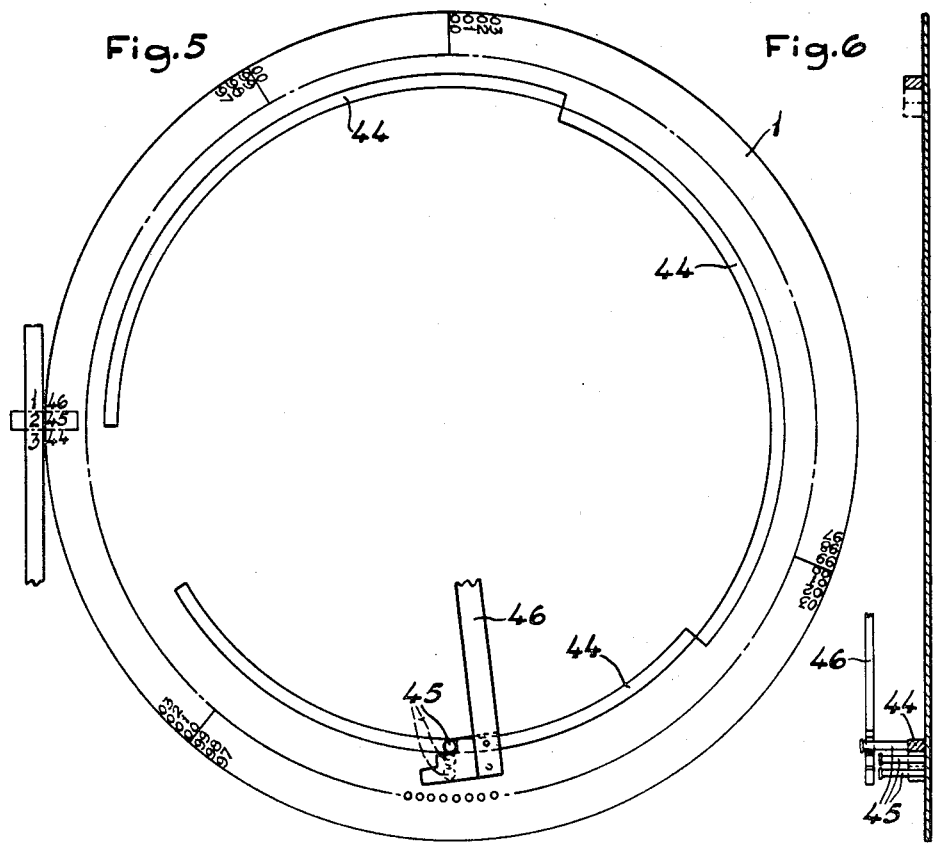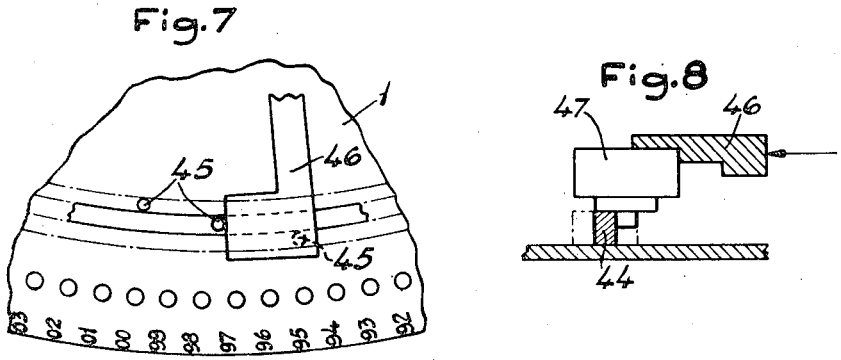

United States Patent Office 2,764,955
Patented Oct. 2, 1956

2,764,955

DEVICE FOR SUMMING-UP AUTOMATICALLY THE ADDITIONAL WEIGHT IN BALANCES WITH A REGISTERING DEVICE

Heinz Adolf Dzaack, Eskilstuna, Sweden, assignor to Aktiebolaget Stathmos, Vilsta, Eskilstuna, Sweden Application October 4, 1954, Serial No. 460,098

Claims priority, application Sweden September 21, 1954

11 Claims. (Cl. 116—129)

The present invention relates to a device for automatically summing up weight in balances provided with a registering device, comprising a type disc having, for example, two-figure numbers indicating weight of a certain unit of weight, and preferably a sector or the like indicating decimal portions of the unit of weight, and an adjustable flag or the like indicating the number of a greater unit of weight.

In order to be able to increase the capacity of a balance, that is, the weighing range, additional loads are used. The registration of the weight with regard to such a balance of a well-known kind, for example by printing on a card, is carried out in such a manner that the weight that is added and constitutes the increase of the capacity of the balance is printed on the card separately beside the normal basic weight, that is, if the basic capacity of the balance is 100 kgs. and the load on the balance is 70 kgs., the pointer of the balance will point at 70 on the scale graduated to 100 kgs. If on the other hand, the load is 170 kgs., an extra load is added which increases the capacity of the balance by 100 kgs. The result of the weighing thus increases from 100 to 200 kgs., but the scale is still graduated to 100 kgs. In the known balances with registering device a flag on the scale and a scale beside a stamping or type disc are moved at the same time as the said extra weight is added, the first flag indicating the weight added, the latter indicating the same weight to be printed for example on a card. Thus, on the side of the pointer one can read 70 kgs. (on the graduation disc) and +100 kgs. (on the flag). The weight printed on the card indicates 70 kgs.+100 kgs. As can be seen from this example it is necessary each time to sum up the two weights, which is a disadvantage, particularly when the checking of more weighing results is concerned.

Through the present invention a summing-up of the two weights is made possible, so that the printed registration only indicates a single number, thus 170 kgs. would be shown instead of 70+100 kgs. The invention is particularly suited for registering devices with digit stamping.

The invention is substantially characterized thereby that means connected with the type disc are arranged so as to permit a mechanism driven by the registering device and connected with the flag to adjust the said flag in such a manner that the latter indicates the number of greater units.

An embodiment of the invention is shown in the accompanying drawing.

Fig. 1 illustrates a front view of a registering device for printing figures, the said device being of the type shown in Figs. 21, 22, and 23 in patent application No. 445,400, and being provided with a device for summing up additional weights in accordance with the invention.

Fig. 2 illustrates a side elevational view of the device according to Fig. 1, seen from the right side.

Fig. 3 illustrates a side elevational view, seen from the left side of Fig. 2.

Fig. 4 illustrates a sectional detail of the stamping disc.

Figs. 5 and 6 illustrate front and side elevational views of another embodiment of a type disc and the testing or indexing device.

Figs. 7 and 8 illustrate other embodiments of the testing device together with the type disc shown in Figs. 5 and 6.

The type disc 1 is attached to the same shaft 2 as the pointer of a balance (not shown) moves counterclockwise at weighing (Fig. 1). The disc 1 carries digit types corresponding for example to a capacity of the balance of 100 kgs., thus from 0 to 100 kgs. The numbers on the type disc (designated by 3 in Fig. 1) are of two figures and begin with 00, 01, 02, 03, and so on to 98, 99, 00. The decimals (designated by 4) are provided on a segment flag 5 which is adjusted for registration in accordance with principles known, as will be hereinafter described. The segment flag 5 is attached to a sector 6 mounted on a tubular shaft (not shown) attached to the frame, the said tubular shaft being coaxial with the shaft 2, and a shaft 7 described below, is carried by a support member 8. A flag 9 is movable vertically on a holder 10 which is movably mounted in bearings 10a and 10b, carries types of figures corresponding to the desired amount of the additional weight for the increase of the capacity of the balance. The flag 9 is set on the desired additional weight by means of a double-armed lever 11 serving as a setting member, and a movably mounted rod 12 connected with the lever 11, a double-armed lever 13 being mounted on the rod 12, one of the arms of the lever 13 being connected with a link 14 described below and the second arm being connected with the holder 10, so that the latter is displaced together with the flag when the lever 11 is moved. The link 12 is movably mounted in two bearings 12a and 12b. The type disc 1, as described in the patent application No. 445,400 is provided along its circumference with equidistant holes 15, each corresponding to one of the hundred digits on the type disc. Ten pins 17 are rockably mounted in a pin holder 16, which pins are preferably spring-actuated inward towards the type disc 1, and which are arranged in a similar manner in relation to the holes 15 as the vernier lines of a vernier scale in relation to the lines of an appurtenant scale. A handle 18 which can be turned down in order to effect registration is attached to a shaft 19, which by means of a cam or some other suitable device actuates the pin holder 16 in such a manner that the latter is swung inward towards the type disc 1 when the handle starts its downward motion, whereby the pin corresponding to the decimal value of the weight enters one of the holes 15. If, in an example, the weight is 99.9 kgs., the last pin, from the right, will enter one of the holes. Thereby the position of the type disc is fixed. In this case no additional load is required, and the setting lever 11 is set on 0.

On the shaft 19 a cam 20 is fixed, which normally holds the left end of a lever 22 fixed to the rod 21 in a lifted-up position so that a link 23 pivotally connected with the right end of the lever 22 and the sector 6, holds the sector 6 in a determined initial position. When the turning of the handle continues, the cam 20 permits the sector 6 to move clockwise in a well-known manner via 22 and 23, until a stop arm 24 rigidly connected with the sector strikes against the inner end of that pin 17 that has entered one of the holes 15, as described above. Thereby the position of the sector 6 is fixed. Thus, in the example chosen the segment flag 5 is set on 9.

An arm 25 attached to the shaft 19 is connected via a link 26 with an arm 27 mounted on the shaft 7, the arm 27 being connected by means of a tension spring 28 with one arm 29 of an angle lever 29, 30 mounted on the shaft 7, arm 29 being provided with a stop pivot 29a by means of which the arm 29 normally rests against the arm 27. The other arm 30 of the angle lever is connected via a link 31 having a slot 31a to one arm of a lever 32 which is mounted on the above-mentioned holder 10, the other arm of the said lever engaging a pin 33 attached to the flag 9. In the pin holder 16 a displaceable testing or indexing pin 34 is further arranged, which is also preferably spring-actuated inwards. Besides the hole 15 there is also provided a hole nearer the centre of the type disc 1, which hole is positioned exactly opposite the pin 34 when the decimal value of the weight is 0, so that the pin 34 enters this hole, when the pin holder 16 is swung inwards, as mentioned above, while the pin 34 is barred by the type disc 1, when the decimal value lies between 1 and 9. When the handle 18 is swung down, the angle lever 29, 30 is turned, in the example chosen, via 26, 27, and 28 clockwise, until the arm 30 which constitutes a second testing or indexing device strikes against the outer end of the pin 34, after which the arm 27 continues to move and stretches the spring 28. The lever 32 is in this case not actuated by the link 31, as idleness is effected by the slot 31a. If, on the other hand, the type disc 1 has rotated one revolution, to 00, that is, the decimal value of the weight is 0, the pin 34 enters the last hole in the type disc, and the outer end of the pin 34 then does not stop the arm 30 of the angle lever, but the latter continues to move until it strikes against another pin 35 arranged in a similar manner in the pin holder 16, which pin 35 may also be replaced by a fixed stop. In this case the lever 32 is swung clockwise, whereby the left end of the latter lifts the pin 33 and thus also the flag 9 one step, so that the latter in the manner desired indicates the nearest higher number of the greater unit, that is, the digit 1 in the example shown, so that the registration will be 100.0.

In order that the figures of the flag 9 shall always be positioned exactly opposite the figures of the type disc 1, which latter figures vary according to the decimal value of the weight, the position of the flag 9 must be automatically varied correspondingly. This is obtained thereby that the above-mentioned link 14 in which the lever 13 is mounted is connected to the lever 22 at a point suitable for this purpose, so that the sector 6 when swinging counter-clockwise proportionally to the decimal value of the weight, as described above, lowers via 23, 22, and 14 the holder 10 and thus also the flag 9 as much as is necessary, so that the stamping position of the flag 9 is fixed exactly in accordance with the stamping position of the disc 1. Thus, the flag 9 can carry out three movements superimposed upon each other, that is, one movement for setting the desired additional weight by means of 11, 12, 13, and 10, one movement for displacing the flag one step, when the type disc 1 has rotated one revolution, by means of 25, 26, 27, 28, 29, 30, 31, 32, and 33, and one movement for bringing the digits of the flag 9 exactly opposite the figures of the type disc 1 by means of 6, 23, 22, 14, 13, and 10. Such superimposed movements can be brought about without any difficulty in several ways, and therefore the device shown is intended only as an example.

After the figures of the flag 9, the type disc 1 and the segment flag 5 have been set in the manner described, the registration is to be carried out. This is done by the continued swinging-down motion of the handle 18 by means of an arm 36 which by means of a link 37 and an arm 39 attached to a shaft 38 and a cam 40 attached to the said shaft 38 presses the stamping pad 41 against the type disc 1. The type disc is at its edge formed with a step (Fig. 4) into which the segment flag 5 is pressed through the action of the stamping pad, so that the figures of the type disc 1 and those of the segment flag 5 are lying in the same plane, as is indicated by dashed lines in Fig. 4. Thus, an impression is obtained for example on a card which is put between the type disc and the printing pad. In the example chosen 99.9 kgs. are registered.

After the registration the whole mechanism is pulled back to the initial position by means of a spring 42, which with its upper end is attached to the frame and with its lower end to an arm 43 attached to the shaft 19 of the handle 18.

If it shall be possible to be able to weigh and register weights up to 200 kgs., the capacity of the balance must be increased by 100 kgs., and therefore the setting member 11 must be set on +100, so that the number 1 on the flag 9 will come into stamping position when all weights from 100.0 to 199.9 kgs. are concerned. When 200 kgs. are weighed, the flag 9 is lifted one step in the manner described above, and the registration will be 200 kgs.

The device described here can as a principle be used in all cases where figures are stamped by means of type discs or type wheels. Besides, by means of this fundamental idea it is possible to form type discs for 200 kgs. and therebeyond, the type disc being provided with two hundred numbers or more instead of a hundred numbers.

Examples of such devices are shown in Figs. 5–8 which illustrate different alternatives for the testing or indexing. The type disc is here provided with curved elevations in the form of bars 44 with radii of different size attached to the type disc. The number of bars depends upon the division of the type disc, for example two bars for 200 divisions, three bars for 300 divisions (that is, two respectively three of the greater weight units) and so on.

Figs. 5 and 6 show a device with testing or indexing pins each placed radially exactly opposite its bar 44. The number of pins equals the number of bars. The testing or indexing surface of the indexing arm 46 (corresponding to the arm 30 in Fig. 1) is step-formed, so that its motion will be of different magnitude depending on which pin strikes against one of the bars 44. The arm 46 is connected to the flag in a manner similar to that shown in Figs. 1–4, so that the flag 9 (in Fig. 1) is set on the number of greater units of the weight.

According to Fig. 7 the pins are placed stepwise while the surface of the indexing arm is plain.

Fig. 8 shows a step-formed pin 47, the movement of which differs depending on with which bar it comes into contact. The indexing arm also has a step-formed testing surface, whereby its motion will depend on the motion of the pin towards the disc, so that the flag will be set as in the arrangements according to Figs. 6 and 7.

The devices described and shown are only intended as examples, it being possible to modify the details of the devices and to replace details by similar ones within the scope of the invention. For example the hole in the type disc cooperating with the pin 34 in Fig. 1 can be replaced by a recess in the edge of said disc, whereby the pin can move at right angles to the disc, as in the example shown or move in the plane of the disc. This also applies to the holes 15 and the pins 17. If the pin 34 moves in the plane of the disc, it may itself be connected with the flag, so that the testing arm 30 will be superfluous. In Figs. 5–8 the bars 44 may be replaced by stepwise different radii of the disc 1 in the corresponding way or by a disc connected therewith, whereby a testing member can move in the plane of the disc and be directly connected with the flaw, so that now in this case double testing devices are required.

The purpose of the invention is to displace the flag 9 one step when the weight is increased from one number of the greater units (plus some smaller units) to the next higher number of the said greater units. Thus, in Figs. 1–3 (if 11 is set on 0 kg.) the flag 9 is raised one step when the weight is increased from 1.99 to 2.00 and in Figs. 5–8 it is raised one step when the weight is increased from 1.99 to 2.00 or from 2.99 to 3.00, etc. In Fig. 5 this is accomplished thereby that the end of the arm 46 (which corresponds to 30 in Fig. 1) is step-formed, so that its motion will be of different magnitude, depending on which pin 45 (which pins of course are carried by the pin holder 16, Fig. 1, but for simplicity of the drawing not shown in Fig. 5) comes into contact with one of the bars 44, and this in turn depends, as is clearly seen, on the number of greater units of the weight, and the arm 46 by the mechanism shown in Fig. 1 displaces the flag one step for each increase of the weight by one greater unit. In Fig. 7, instead of the stepform of the end of the arm 46 the pins 45 are shown mutually displaced in the circumferential direction of the disc, which gives exactly the same result. In Fig. 8 the pin 47 is step-shaped and so the movement thereof towards the disc depends on which of the bars 44 it contacts and thus again on the number of the greater units of the weight. In this case also the arm 46 is step-shaped, so that its movement towards the pin 47 depends on the position of the pin 47, whereby the arm 46 will set the flag in the same manner as in Figs. 5 and 7.

Having now described my invention, what I claim as new and desire to secure by Letters Patent is:

1. In a device for summing-up automatically the additional weight in balances with registering device comprising a type disc with two-figure numbers indicating the weight in a certain unit of weight, a sector indicating decimals, and an adjustable flag indicating a number of a greater unit of weight, including a testing member connected with the flag through a movement transferring mechanism, said testing member being movable by means of the registering device at right angles to the disc in order to index a formation of the disc, the testing member being movable to different positions corresponding to the number of the greater units of the weight, said movement transferring device setting the flag in the position in which it indicates the number of the said greater units of the weight.

2. A device according to claim 1, wherein the type disc is graduated up to said greater unit and includes a hole provided in the type disc, the testing member consisting of a pin arranged so as to enter the said hole only in the position assumed by the disc when the weight equals such a greater unit.

3. A device according to claim 1, wherein that the type disc is graduated up to a plurality of greater units, the testing member comprises formations of the type disc arranged along circle arcs coaxial with the disc, the said formations being arranged so as to restrict the motion of the testing member stepwise in different ways depending on the number of greater units of weight.

4. A device according to claim 3, wherein that the said formations consist of axial elevations of different radii arranged on the disc.

5. A device according to claim 4, wherein the testing member consists of pins each cooperating with one of the said elevations.

6. A device according to claim 4, wherein the testing member consists of a step-formed pin.

7. A device according to claim 6, including a second testing device connected with the flag is arranged so as to index the position of the former testing member for setting the said flag.

8. A device according to claim 1, wherein the movement transferring mechanism comprises a lever connected with the registering device, which lever is turnably mounted in a holder carrying the flag, said holder being adjustable by means of a setting member for setting the desired additional weight.

9. A device according to claim 8 including a device movably depending on the movement of the member carrying the decimals, is arranged so as to impart to the flag a second superimposed motion corresponding to the positions of the type disc at different decimal values of the weight so that the figures on the flag will always be positioned exactly opposite the figures of the type disc.

10. A device according to claim 9, characterized thereby that the member carrying the decimals is connected with one arm of a double-armed lever the other arm of which is connected with the holder.

11. A device according to claim 10, characterized thereby that the latter lever is mounted in a bearing member which is displaceable by means of a setting member for setting the flag on the said additional weight.

References Cited in the file of this patent
UNITED STATES PATENTS

| | | |
|---|---|---|
| 1,864,570 | Williams | June 28, 1932 |
| 1,892,726 | Hadley | Jan. 3, 1933 |
| 2,013,940 | Williams | Sept. 10, 1935 |
| 2,188,261 | Basquin | Jan. 23, 1940 |